United States Patent Office 3,631,182
Patented Dec. 28, 1971

3,631,182
ALIPHATIC BIS(AZIDOFORMATE)S
David S. Breslow, Wilmington, Del., assignor to Hercules Incorporated, Wilmington, Del.
No Drawing. Continuation-in-part of application Ser. No. 418,278, Dec. 14, 1964, which is a continuation-in-part of applications Ser. No. 172,815, Feb. 12, 1962, now Patent No. 3,211,752, and Ser. No. 247,878, Dec. 28, 1962. This application May 21, 1970, Ser. No. 39,521
Int. Cl. C07d 109/00
U.S. Cl. 260—349  11 Claims

ABSTRACT OF THE DISCLOSURE

Aliphatic compounds containing from 2 to 4 azidoformate groups are described, which compounds are useful for cross-linking various polymers, particularly polyolefins. Typical compounds are alkylene bis-, tris- and tetrakis(azidoformate)s such as tetramethylene bis(azidoformate), alkylene bis(polyoxyalkylene) bis(azidoformate)s such as the bis(azidoformate)s of poly(ethylene glycol)s and poly(propylene glycol)s.

---

This application is a continuation-in-part of my application U.S. Ser. No. 418,278, filed Dec. 14, 1964, which is in turn a continuation-in-part of my application U.S. Ser. No. 172,815, filed Feb. 12, 1962, now U.S. Pat. No. 3,211,752, and of my application U.S. Ser. No. 247,878, filed Dec. 28, 1962, now abandoned.

This invention relates to poly(azidoformate)s, which compounds are new agents useful cross-linking polymers.

In the past, industry has depended almost entirely upon sulfur or sulfur-bearing materials as vulcanizing, i.e., cross-linking agents. It has more recently been discovered that certain types of organic peroxides or azo compounds are capable of acting as vulcanizing agents. However, all of the above agents suffer the drawback that because of their mode of action they are not equally effective in cross-linking all types of polymers. For example, polybutadiene is effectively vulcanized by peroxides while butyl rubber and crystalline polypropylene are not.

Now in accordance with this invention, it has unexpectedly been found that a number of polymers can be cross-linked by non-volatile azidoformate compounds to produce vulcanizates that are tough, resilient, solvent resistant, and odor free. In addition, it has been found that the polymers can be treated with smaller amounts of the azidoformates to improve their properties without materially affecting their solubility.

The new azidoformates of this invention are solids or oils having the general formula

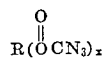

$$R(\overset{O}{\overset{\|}{O}}CN_3)_x$$

where $x$ is at least 2, preferably from 2 to 4, and R is an organic radical, inert to cross-linking reactions, containing at least one carbon atom per azidoformate group, the azidoformate groups being attached to different carbon atoms in said R group.

Exemplary of the new poly(azidoformate)s of this invention are those compounds having the above formula wherein:

(1) R is alkylene:
ethylene bis(azidoformate)
trimethylene bis(azidoformate)
2-methyl-ethylene bis(azidoformate)
tetramethylene bis(azidoformate)
3-methylpropane-1,3-bis(azidoformate)
1,2-dimethyl ethylene-bis(azidoformate)
2,2-dimethyl ethane-1,2-bis(azidoformate)
pentamethylene bis(azidoformate)
pentane 1,4-bis(azidoformate)
pentane-1,3-bis(azidoformate)
pentane-2,4-bis(azidoformate)
pentane-1,2-bis(azidoformate)
2-methylbutane-1,2-bis(azidoformate)
2-methylbutane-1,3-bis(azidoformate)
2-methylbutane-1,4-bis(azidoformate)
2-methylbutane-2,3-bis(azidoformate)
2-methylbutane 2,4-bis(azidoformate)
2-methylbutane-3,4-bis(azidoformate)
2,2-dimethylpropane-1,3-bis(azidoformate)
hexamethylene bis(azidoformate)
hexane-1,5-bis(azidoformate)
hexane-2,4-bis(azidoformate)
hexane-2,5-bis(azidoformate)
hexane-3,4-bis(azidoformate)
2-methylpentane-1,2-bis(azidoformate)
2-methylpentane-1,3-bis(azidoformate)
2-methylpentane-2,3-bis(azidoformate)
2-methylpentane-2,4-bis(aziodoformate)
2-methylpentane-2,5-bis(azidoformate)
3-methylpentane-2,4-bis(azidoformate)
2,2-dimethylbutane-1,3-bis(azidoformate)
2,2-dimethylbutane-1,4-bis(azidoformate)
2,2-dimethylbutane-3,4-bis(azidoformate)
2,3-dimethylbutane-1,2-bis(azidoformate)
2,3-dimethylbutane-2,3-bis(azidoformate)
heptamethylene bis(azidoformate)
2-methylhexane-2,6-bis(azidoformate)
2-methylhexane-4,6-bis(azidoformate)
3-methylhexane-1,6-bis(azidoformate)
3-methylhaxane-2,4-bis(azidoformate)
2,2-dimethylpentane-1,3-bis(azidoformate)
2,2-dimethylpentane-1,5-bis(azidoformate)
2,4-dimethylpentane-1,3-bis(azidoformate)
2,4-dimethylpentane-2,3-bis(azidoformate)
2,4-dimethylpentane-2,4-bis(azidoformate)
octamethylene bis(azidoformate)
octane-4,5-bis(azidoformate)
2-methylheptane-2,6-bis(azidoformate)
3-methylheptane-2,4-bis(azidoformate)
4-methylheptane-3,4-bis(azidoformate)
4-methylheptane-3,5-bis(azidoformate)
2,5-dimethylhexane-1,2-bis(azidoformate)
2,5-dimethylhexane-2,5-bis(azidoformate)
3,4-dimethylhexane-3,4-bis(azidoformate)
2,2,4-trimethylpentane-1,3-bis(azidoformate)
2,2,4-trimethylpentane-1,4-bis(azidoformate)
2,2,4-trimethylpentane-3,4-bis(azidoformate)
2,2,4-trimethylpentane-4,5-bis(azidoformate)
nonane-1,9-bis(azidoformate)
2,6-dimethylheptane-2,6-bis(azidoformate)
2,2,5-trimethylhexane-1,3-bis(azidoformate)
2,3,3,4-tetramethylpentane-2,4-bis(azidoformate)
decane-1,10-bis(azidoformate)
decane-1,2-bis(azidoformate)
2-methylnonane-1,2-bis(azidoformate)
2,6-dimethyloctane-3,8-bis(azidoformate)
2,7-dimethyloctane-4,5-bis(azidoformate)
4,5-dimethyloctane-4,5-bis(azidoformate)
3,4-diethylhexane-3,4-bis(azidoformate)
2,2,5,5-tetramethylhexane-3,4-bis(azidoformate)
2,3,4,5-tetramethylhexane-3,4-bis(azidoformate)
undecane-2,3-bis(azidoformate)
2-methyldecane-1,2-bis(azidoformate)
2,6-dimethylnonane-2,8-bis(azidoformate)
2,8-dimethylnonane-2,8-bis(azidoformate)
3,7-dimethylnonane-2,8-bis(azidoformate)
3-methyl-6-ethyl-octane-3,6-bis(azidoformate)
2-methyl-5-isobutyl-hexane-1,6-bis(azidoformate)
dodecane-6,7-bis(azidoformate)

(1) R is alkylene:
   2-methylundecane-1,2-bis(azidoformate)
   3,6-diethyloctane-3,6-bis(azidoformate)
   4,5-diethyloctane-4,5-bis(azidoformate)
   2,4,5,7-tetramethyloctane-4,5-bis(azidoformate)
   3,4,5,6-tetramethyloctane-4,5-bis(azidoformate)
   2,2,3,4,5,5-hexamethylhexane-3,4-bis(azidoformate)
   2-isoamyl-5-methyl-hexane-1,2-bis(azidoformate)
   2-methyldodecane-1,2-bis(azidoformate)
   2,5,6,9-tetramethyldecane-5,6-bis(azidoformate)
   4,5-dipropyloctane-4,5-bis(azidoformate)
   hexadecane-1,2-bis(azidoformate)
   hexadecane-1,16-bis(azidoformate)
   hexadecane-1,11-bis(azidoformate)
   2,6,7,11-tetramethyldodecane-6,7-bis(azidoformate)
   4,9-dipropyldodecane-4,9-bis(azidoformate)
   nonadecane-1,19-bis(azidoformate)
   eicosane-1,20-bis(azidoformate)
   8-isoamyl-2,5,11-trimethyldodecane-5,8-bis(azidoformate)
   heneicosane-1,21-bis(azidoformate)
   docosane-1,22-bis(azidoformate)
   docosane-11,12-bis(azidoformate)
   10,11-dimethyl-eicosane-10,11-bis(azidoformate)
   tetracosane-12,13-bis(azidoformate)
   11,12-dimethyldocosane-11,12-bis(azidoformate)
   4,8,13,17-tetramethyl-eicosane-1,20-bis(azidoformate)
   pentacosane-1,25-bis(azidoformate)
   5,14-dibutyloctadecane-5,14-bis(azidoformate)
   octacosane-14,15-bis(azidoformate)
   dotriacontane-1,32-bis(azidoformate)
   tetratriacontane-1,15-bis(azidoformate)
   7,16-dihexyl-docosane-7,16-bis(azidoformate)
   hexatriacontane-18,19-bis(azidoformate)
   2-butyl-2-(ethoxymethyl)-propane-1,3-bis(azidoformate)
   2,4-dimethyl-2-(ethoxymethyl)-pentane-1,5-bis(azidoformate)
   2-(butoxymethyl)-2,4-dimethyl-pentane-1,5-bis(azidoformate)
   glycerol tris(azidoformate)
   butane 1,2,3-tris(azidoformate)
   butane 1,2,4-tris(azidoformate)
   pentane 1,2,3-tris(azidoformate)
   pentane 1,2,4-tris(azidoformate)
   pentane 2,3,4-tris(azidoformate)
   2-methylbutane-1,2,3-tris(azidoformate)
   hexane-1,2,5-tris(azidoformate)
   hexane-2,3,4-tris(azidoformate)
   2-methylpentane-1,2,3-tris(azidoformate)
   2-methylpentane-2,4,5-tris(azidoformate)
   heptane-1,4,7-tris(azidoformate)
   2-methylhexane-3,5,6-tris(azidoformate)
   3-methylhexane-3,5,6-tris(azidoformate)
   2-methylheptane-4,6,7-tris(azidoformate)
   4-methylheptane-1,2,4-tris(azidoformate)
   3-ethylhexane-3,5,6-tris(azidoformate)
   2,3-dimethylhexane-3,5,6-tris(azidoformate)
   4-methyloctane-1,2,4-tris(azidoformate)
   2,4-dimethyl-heptane-4,6,7-tris(azidoformate)
   3,4-dimethyl-heptane-4,6,7-tris(azidoformate)
   2,2,3-trimethyl-hexane-3,5,6-tris(azidoformate)
   decane-1,2,4-tris(azidoformate)
   4-propylheptane-1,2,4-tris(azidoformate)
   4-methyldecane-1,2,4-tris(azidoformate)
   2,6-dimethyloctane-2,3,8-tris(azidoformate)
   undecane-1,5,6-tris(azidoformate)
   5-ethylnonane-4,5,6-tris(azidoformate)
   octadecane-1,9,10-tris(azidoformate)
   octadecane-1,2,3-tris(azidoformate)
   3-ethyl-tridecane-3,12,13-tris(azidoformate)
   4-propyl-tetradecane-4,13,14-tris(azidoformate)
   heptadecane-1,2,3-tris(azidoformate)
   2,4,8-trimethyl-decane-1,5,9-tris(azidoformate)
   butane-1,2,3,4-tetrakis(azidoformate)
   carbyl tetrakis(methylene azidoformate)
   pentane-1,2,3,4-tetrakis(azidoformate)
   pentane-1,2,3,5-tetrakis(azidoformate)
   pentane-1,2,4,5-tetrakis(azidoformate)
   hexane-1,2,3,4-tetrakis(azidoformate)
   hexane-1,2,5,6-tetrakis(azidoformate)
   hexane-1,3,4,5-tetrakis(azidoformate)
   hexane-1,3,4,6-tetrakis(azidoformate)
   hexane-2,3,4,5-tetrakis(azidoformate)
   octane-1,3,5,7-tetrakis(azidoformate)
   2,5-dimethyl-hexane-1,2,5,6-tetrakis(azidoformate)
   2,5-dimethyl-hexane-2,3,4,5-tetrakis(azidoformate)
   hexadecane-1,7,8,16-tetrakis(azidoformate)
   tetratriacontane-9,10,25,26-tetrakis(azidoformate)
   3-methoxy-propane-1,2-bis(azidoformate)
   3-ethoxy-propane-1,2-bis(azidoformate)
   3-isoamyloxy-propane-1,2-bis(azidoformate)
   4-methoxy-butane-1,2-bis(azidoformate)
   4-ethoxy-butane-1,2-bis(azidoformate)
   1-ethoxy-pentadecane-8,9-bis(azidoformate)
   2,2-bismethoxymethyl)-propane-1,3-bis(azidoformate)
(2) R is oxydialkylene:
   2,2'-oxydiethyl-bis(azidoformate)
   2,2'-oxydipropyl-bis(azidoformate)
   3,3'-oxydipropyl-bis(azidoformate)
   2,2'-oxydiisobutyl-bis(azidoformate)
   3,3'-oxydibutyl-bis(azidoformate)
   4,4'-oxydibutyl-bis(azidoformate)
(3) R is thiodialkylene:
   2,2'-thiodiethyl-bis(azidoformate)
   2,2'-thiodipropyl-bis(azidoformate)
   3,3'-thiodipropyl-bis(azidoformate)
   4,4'-thiodibutyl-bis(azidoformate)
   2,2'-thiodi(2-methylbutyl)-bis(azidoformate)
(4) R is sulfonyldialkylene:
   1,1'-sulfonyldiethylene-2,2'-bis(azidoformate)
   2-(2'-azidocarbonyloxyethylsulfonyl) propyl-2-azidoformate
   1,1'-sulfonyldi-(2-propyl azidoformate)
   1,1'-sulfonyldi-(3-propyl azidoformate)
   2-(2-azidocarbonyloxyethylsulfonyl) propyl-1-azidoformate
   1-(2-azidocarbonyloxyethylsulfonyl) propyl-2-azidoformate
   2-(2-azidocarbonyloxypropylsulfonyl) propyl-1-azidoformate
   3-(2-azidocarbonyloxy-1-methylethylsulfonyl) butyl-2-azidoformate
   1,1'-sulfonyl bis(2-methyl-2-propyl azidoformate)
   1,1'-sulfonyldi(2-methylbutyl-2-azidoformate)
   3-(2-azidocarbonyloxyethylsulfonyl) propyl-1-azidoformate
   3-(2-azidocarbonyloxypropylsulfonyl) propyl-1-azidoformate
   4-(2-azidocarbonyloxyethylsulfonyl) butyl-1-azidoformate
   5-(2-azidocarbonyloxyethylsulfonyl) pentyl-1-azidoformate
   bis(2-azidocarbonyloxycyclopentyl) sulfone
   bis(2-azidocarbonyloxycyclohexyl) sulfone
   bis(2-azidocarbonyloxymethylcyclohexyl) sulfone
   bis(2-azidocarbonyloxycycloheptyl) sulfone
(5) R is alkylene poly(oxyalkylene):
   2,2'-ethylene dioxydiethyl bis(azidoformate)
   3,3'-propylene dioxydipropyl bis(azidoformate)
   4,4'-tetramethylene dioxydibutyl bis(azidoformate)
   ethylene bis(oxybutyl-4-azidoformate)
   4,4'-propylene dioxybutyl bis(azidoformate)
   4,4'-(2,2-dimethylpropylene)-dioxybutyl bis(azidoformate)
   4,4'-pentamethylene dioxybutyl bis(azidoformate)
   4,4'-hexamethylene dioxybutyl bis(azidoformate)
   6-methyl-4,7-dioxa-decane-2,9-bis(azidoformate)

(5) R is alkylene poly(oxyalkylene):
the tris(azidoformate) of glycerol-propylene oxide adduct
(6) R is alkylene bis(polyoxyalkylene):
the bis(azidoformate)s of poly(ethylene glycols)s and
poly(propylene glycol)s from tetraethylene glycol and
tetrapropylene glycol up to the high molecular weight poly(ethylene glycol)s and poly(propylene glycol)s
(7) R is the radical

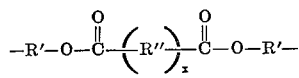

where each R' can be a bivalent or trivalent alkylene radical, R" is a bivalent alkylene radical and $x$ is 0 or 1:
bis(2-azidocarbonyloxyethyl) oxalate
bis(2-azidocarbonyloxyethyl) glutarate
bis(3-azidocarbonyloxypropyl) glutarate
bis(2-azidocarbonyloxyethyl) adipate
bis(3-azidocarbonyloxypropyl) adipate
bis(4-azidocarbonyloxybutyl) adipate
bis(5-azidocarbonyloxypentyl) adipate
bis(6-azidocarbonyloxyhexyl) adipate
bis(2-azidocarbonyloxyethyl) sebacate
bis(4-azidocarbonyloxybutyl) sebacate
glycerol tris(2-azidocarbonyloxyethyl adipate)
glycerol tris(4-azidocarbonyloxybutyl adipate)
glycerol tris(2-azidocarbonyloxyethyl sebacate)
glycerol tris(4-azidocarbonyloxybutyl sebacate)
(8) R is alkylene bis(carboalkoxy):
1,2-bis(carbomethoxy)ethylene-1,2-bis(azidoformate)
1,2-bis(carboethoxy)ethylene-1,2-bis(azidoformate)
1,2-bis(carbopropoxy)ethylene-1,2-bis(azidoformate)
tetramethylene-1,4-bis(carbomethoxy)-2,3-bis(azidoformate)
tetramethylene-1,4-bis(carboethoxy)-1,4-bis(azidoformate)
tetramethylene-4,4-bis(carboethoxy)-1,2-bis(azidoformate)
pentamethylene-1,5-bis(carboethoxy)-3-methyl-1,5-bis(azidoformate)
octamethylene-1,8-bis(carbomethoxy)-3,6-bis(azidoformate)
(9) R is carbyl tetrakis(alkyleneoxyalkylene): the tetraazidoformate of pentaerythritol-propylene oxide adduct having the formula $$C(CH_2-O-CH_2\underset{\underset{CH_3}{|}}{CH}-O-\underset{\underset{O}{\|}}{C}N_3)_4$$

Most of these azidoformates are relatively insensitive to impact and are colorless solids or oils. Especially preferred for use in modifying and cross-linking polymers are those azidoformates having a boiling point of at least about 100° C. at a pressure of 70 mm. of mercury.

The azidoformates of this invention can be prepared in various ways, as for example, by reacting a chloroformate with an excess, i.e., from about 1.05 moles to about 10 moles per equivalent of chloroformate, of an alkali azide. This reaction can be shown by the following equation

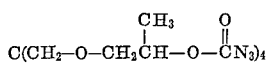

where R and $x$ are as defined above. The chloroformates are well known materials whose preparation is described in the chemical literature, generally by the reaction of a hydroxyl with phosgene. The azidoformates can also be prepared by reacting a polyol with phenyl chloroformate, then cleaving the phenyl carbonate so formed with hydrazine to form the polycarbazate of the diol, which when reacted with sodium nitrite yields the desired poly(azidoformate). This latter type of preparation is particularly effective for converting tertiary alcohols to the azidoformate, yields in such cases generally being low by the phosgene type of preparation. Before describing the invention in greater detail, the following examples are presented to illustrate the preparation of the new azidoformates, all parts and percentages being by weight unless otherwise indicated.

EXAMPLE 1

To a solution of 65 parts of sodium azide in 150 parts of water was added dropwise with vigorous agitation 54 parts of tetramethylene-bis(chloroformate) dissolved in 370 parts of chloroform. The reaction mixture was agitated vigorously and maintained at room temperature for approximately three days. Then the chloroform layer was separated and washed several times with water to remove any water-soluble impurities. The chloroform solution was dried over magnesium sulfate and sodium sulfate. The azidoformate product was isolated by removing the chloroform under vacuum. Tetramethylene-bis(azidoformate) was obtained as an oil which solidified while standing at room temperature and had a melting point of 30.0–31.2° C. The yield was 96.3% of theoretical, and the product was calculated to be 100% pure, based on the liberation of nitrogen upon decomposition of the azidoformate in diphenyl ether at a temperature of 133° C. Analysis for percent carbon, hydrogen, oxygen and nitrogen gave the following figures:

Calculated for $C_6H_8N_6O_4$ (percent): C, 31.58; H, 3.53; O, 28.05; N, 36.84. Found (percent): C, 31.57; H, 3.27; O, 28.19; N, 37.05.

EXAMPLE 2

To a solution of 13 parts of sodium azide in 30 parts of water was added dropwise with vigorous agitation 10 parts of 2,2'-oxydiethyl-bis(chloroformate) dissolved in approximately 60 parts of chloroform. The reaction mixture was agitated vigorously and maintained at room temperature for 20 hours. Then the azidoformate was isolated as described in Example 1. The 2,2'-oxydiethyl-bis(azidoformate) was obtained in a yield of 92.5% of theoretical. It was a white crystalline solid having a melting point of 47.6–48.4° C. Analysis for percent carbon, hydrogen and nitrogen gave the following figures:

Calculated for $C_6H_8N_6O_5$ (percent): C, 29.5; H, 3.3; N, 34.4. Found (percent): C, 29.7; H, 3.1; N, 33.0.

EXAMPLE 3

Pentamethylene bis(azidoformate) was prepared following the general procedure of Example 1 by reacting 58.5 parts of sodium azide in 150 parts of water with 68.7 parts of 1,5-pentane bis(chloroformate) in 475 parts of chloroform at room temperature for 26 hours. The pentamethylene bis(azidoformate) was obtained in a 93.5% yield and infrared analysis showed the typical strong carbonyl and $N_3$ bonds of the azidoformate group. It was a sweet-smelling oil having a refractive index of $n_D^{22°}$ 1.4665 and nitrogen liberation showed it to be 86.5% pure.

EXAMPLE 4

Ethylene bis(azidoformate) was prepared following the general procedure of Example 1 by reacting 10 parts of ethylene bis(chloroformate) in 300 parts of ethylene dichloride with 50 parts of sodium azide dissolved in 120 parts of water at room temperature for about 36 hours. Infrared analysis of the product showed it to have the typical doublet azide peak at 2135 and 2180 cm.$^{-1}$ which were in agreement for this structure.

EXAMPLE 5

Example 4 was repeated except that trimethylene bis(chloroformate) was substituted for the ethylene bis(chloroformate) used in that example. The trimethylene bis(azidoformate) so prepared was analyzed by infrared and found to have the characteristic azide doublet at 2135 and 2180 cm.$^{-1}$ with the carbonyl peak at 1735 cm.$^{-1}$.

EXAMPLE 6

Example 2 was repeated except that 13 parts of 2,2'-oxydipropyl bis(chloroformate) was substituted for the 10 parts of 2,2'-oxydiethyl bis(chloroformate) used in that example. The 2,2'-oxydipropyl bis(azidoformate) was obtained in a yield of about 90%. It was a colorless oil having a refractive index of $n_D^{22°}$ 1.4616. By nitrogen evolution, it was shown to be 99.4% pure.

EXAMPLE 7

Example 2 was repeated except that 12.4 parts of 2,2'-thiodiethyl bis(chloroformate) was substituted for the 10 parts of 2,2'-oxydiethyl bis(chloroformate) used in that example. The 2,2'-thiodiethyl bis(azidoformate) so obtained was a colorless oil having a refractive index of $n_D^{22°}$ 1.5163. It was obtained in a yield of 77%.

EXAMPLE 8

Example 2 was repeated except that 10.9 parts of 2,2'-ethylenedioxydiethyl bis(chloroformate) was substituted for the 10 parts of 2,2'-oxydiethyl bis(chloroformate) used in that example. The 2,2'-ethylenedioxyethyl bis(azidoformate) so obtained was a clear oil which had a refractive index of $n_D^{22°}$ 1.4715. It was obtained in a yield of 87%. On analysis, it was found to contain 33.6% carbon, 4.1% hydrogen, 28.2% nitrogen and 32.8% oxygen. Calculated values for $C_8H_{12}N_6O_6$ are 33.33% carbon, 4.20% hydrogen, 29.16% nitrogen and 33.31% oxygen.

EXAMPLE 9

The tetrakis(chloroformate) of pentaerythritol—propylene oxide was prepared by adding the tetrol to phosgene at 0° C. A solution of 13 parts of this product in 150 parts of chloroform was added at room temperature to a solution of 10.4 parts of sodium azide in 25 parts of water. The reaction mixture was stirred at room temperature for 4 days, after which the organic layer was separated, washed with water and dried. Infrared analysis showed that no hydroxyl remained and that the product had the typical azide doublet at 2135 and 2180 cm.$^{-1}$ with a strong carbonyl at 1750 cm.$^{-1}$. The carbyl tetrakis (methyleneoxyisopropylene azidoformate) was a viscous colorless oil, obtained in a 93% yield, and 99% pure as determined by nitrogen evolution.

EXAMPLES 10–12

In these examples, bis(azidoformate)s of polyethylene glycols and polypropylene glycol were prepared.

The bis(chloroformate)s of a commercial poly(ethylene glycol) having a DP of 6.7 (11.3% hydroxyl), of a commercial poly(ethylene glycol) having a DP of 9.3 (8.3% hydroxyl), and of a poly(propylene glycol) having a DP of 7.3 (8.4% hydroxyl) were prepared by adding the diols to an excess of phosgene at 0° C. All three products were oils with refractive indices of $n_D^{22°}$ 1.4641, 1.4668 and 1.4488, respectively.

The bis(azidoformate)s were prepared by the process used in Example 2, using 22 parts of the bis(chloroformate) of poly(ethylene glycol) of DP 6.7; 28.4 parts of the bis(chloroformate) of poly(ethylene glycol) of DP 9.3; and 28.4 parts of the bis(chloroformate) of poly(propylene glycol) of DP 7.3. The azidoformates were oils in each case having refractive indices of $n_D^{22°}$ 1.4732, 1.4740 and 1.4574, respectively. They were obtained in yields of 90, 92 and 98% and were 91, 90 and 100% pure, respectively, based on nitrogen evolution analysis.

EXAMPLE 13

In this example, bis(3-azidocarbonyloxypropyl) sulfone, which can also be named as 1,1'-sulfonyldi(3-propyl azidoformate), was prepared.

While cooling 15 parts of bis(3-hydroxypropyl) sulfide and 120 parts of methylene chloride at −5° C., 30 parts of phosgene was added. The reaction was stirred at +3° C. for 2.5 hours, then slowly warmed to room temperature and stirred for an additional 18 hours. The solution was refluxed gently to remove dissolved HCl and phosgene. This solution of the bis(chloroformate) was added dropwise to a slurry of 26 parts sodium azide, 75 parts, $H_2O$, and 50 parts acetone. After stirring for 21 hours at room temperature the methylene chloride solution was water washed and dried over magnesium sulfate. On removal of the solvents under aspirator vacuum there was obtained 28.5 parts of 3,3'-thiodipropyl-bis(azidoformate). The infrared spectrum on this product showed a strong azide band at 2130 cm.$^{-1}$ and the carbonyl band at 1730 cm.$^{-1}$. On analysis the product was shown to contain 28.6% nitrogen (theory is 29.1%) and 10.8% sulfur (theory is 11.1%).

A solution of 28 parts of the above 3,3'-thiodipropyl-bis(azidoformate) in 65 parts of acetic acid was chilled in an ice bath, and 23 parts of 37% hydrogen peroxide was added with stirring while keeping the temperature below 20° C. The reaction mixture was then stirred at room temperature for two days, poured into 150 parts of water, and the sulfone separated. After washing with water until neutral, the sulfone was dried in vacuum at room temperature. In addition to the bands at 2130 and 1730 cm.$^{-1}$ present in the infrared spectrum of the sulfide, peaks, were now present as well at 1150 and 1300 cm.$^{-1}$, indicating formation of the desired 1,1'-sulfonyldi (3-propyl azidoformate). On analysis it was found to contain 25.7% nitrogen (theory 26.2%) and 9.8% sulfur (theory 10.0%).

EXAMPLE 14

This example shows the preparation of 1,1'-sulfonyldiethylene-2,2'-bis(azidoformate). To 99 parts of liquid phosgene in a cooling bath was added 77 parts of bis(2-hydroxyethyl) sulfone and 129 parts of quinoline in 500 parts of methylene chloride with stirring, keeping the temperature below 5° C. After stirring for an additional 30 minutes in the cold, the precipitated quinoline hydrochloride was filtered off, the filtrate being kept cold. To the filtrate was then added a solution 75 parts of sodium azide in 200 parts water and the mixture was stirred vigorously in an ice bath for two days. The organic layer was then separated, washed once with water, dried over magnesium sulfate, and the solvent removed in vacuo at room temperature. Decomposition of a sample of the product in diphenyl ether at 120° C. and determining the amount of nitrogen evolved showed that the bis(2-azidocarbonyloxyethyl) sulfone so obtained was 92% pure.

EXAMPLE 15

In this example 2,6-dimethylheptane-2,6-bis(azidoformate) was prepared.

2,6 - dimethylheptane-2,6-bis(carbazate) was prepared by reacting 2,6-dimethylheptane - 2,6 - bis(phenyl carbonate) with hydrazine. A mixture consisting of 83 parts of the carbazate, 75 parts of glacial acetic acid, and 100 parts of water was cooled in ice, stirred, and 47 parts of sodium nitrite was added in small portions over a period of one hour, maintaining the reaction temperature below 15° C. The reaction mixture was allowed to stand in the ice-bath for an additional hour, 150 parts of water was then added, and the mixture was extracted twice with 150 parts of ether. The ether solution was washed with 5% aqueous sodium bicarbonate until neutral, dried over anhydrous magnesium sulfate, after which the ether was removed under reduced pressure. By heating a sample of the product in diphenyl ether at 120° C. and measuring the amount of nitrogen evolved, the 2,6-dimethylheptane-2,6-bis(azidoformate) so obtained was shown to be 87% pure.

EXAMPLE 16

Ten parts of phosgene was passed into a solution of 3.8 parts of 1,25-pentacosanediol in 15 parts of methylene chloride at 0° C. After stirring for six hours the solvent and excess phosgene were removed under vacuum. This chloroformate was dissolved in 20 parts of tetrahydrofuran and added to a solution of 3.9 parts of sodium azide in 20 parts of water. The reaction mixture was stirred for 4 hours at room temperature and then was diluted with 125 parts of water. The solid bis(azidoformate) was filtered from the reaction mixture and dried. There was obtained 5.0 g. of the 1,25-pentacosane bis(azidoformate). The product had the strong carbonyl absorption at 1735 cm.$^{-1}$ which was indicative of the desired product. An analysis for azide content by infrared found 94% of the theoretical amount of azide present.

EXAMPLE 17

A mixture of 7.4 parts of 1,4,7-heptane triol in 100 parts of ether was cooled at 0° C. while passing in 30 parts of phosgene. After stirring at 2° C. for six hours the reaction mixture was allowed to slowly warm up to room temperature while stirring overnight. This solution of the tris(chloroformate) was gently refluxed to remove phosgene and HCl and then added to a mixture of 19.5 parts of sodium azide, 75 parts of water and 50 parts of acetone. After fluxing for eight hours the solution of the tris(azidoformate) was washed with water three times and dried over magnesium sulfate. The 1,4,7-heptane tris(azidoformate) so obtained contained the strong carbonyl band at 1730 cm.$^{-1}$ and the azide band at 2130 cm.$^{-1}$. A quantitative infrared analysis of the azide band gave 94% of the theoretical amount of azide.

EXAMPLE 18

In this example 1,3,5,7-octane tetrakis(azidoformate) was prepared.

1,3,5,7-octanetetrol (1.8 parts) was added to a solution of 12 parts of phosgene in 50 parts of methylene chloride while cooling at 0° C. After stirring at 2° C. for seven hours the reaction mixture was slowly allowed to warm up to room temperature overnight. The excess phosgene was removed by gently refluxing. This solution of the tetrakis(chloroformate) was added to a slurry of 7.8 parts of sodium azide, 25 parts of water and 20 parts of acetone. After refluxing for 8 hours while rapidly stirring, the reaction mixture was diluted with water and the methylene chloride solution of the tetrakis(azidoformate) was washed with water three times and dried over magnesium sulfate. A quantitative determination of the azide band at 2130 cm.$^{-1}$ present in the product gave 93% of theory.

EXAMPLE 19

In this example, the bis(azidoformate) of a commercial poly(ethylene glycol) having a molecular weight of 4,000, was prepared.

A solution of 40 parts of the poly(ethylene glycol) in 210 parts methylene chloride was stirred at 20° C. while rapidly adding 15 parts of phosgene. The reaction mixture was stirred at room temperature for 19 hours then refluxed to remove the dissolved gases. This solution of the bis(chloroformate) was added to a slurry of 6.5 parts of sodium azide, 25 parts of water and 25 parts of acetone and the mixture was rapidly stirred and refluxed for 8 hours. The methylene chloride solution of the bis(azidoformate) was separated and stripped of solvent. There was obtained 38 parts of the product whose infrared spectrum had the strong azide band of 2130 cm.$^{-1}$ and the carbonyl band at 1735 cm.$^{-1}$. Analysis for nitrogen showed it to contain 1.85% (theory 2.03%).

EXAMPLE 20

In this example bis(2-azidocarbonyloxyethyl) adipate was prepared. While cooling 100 parts of liquid phosgene at −10° C., 58.5 parts of bis(2-hydroxyethyl) adipate was gradually added during one hour. This reaction mixture was stirred for an additional 3 hours and then warmed to room temperature. The excess phosgene was was removed by sparging with nitrogen to leave 87 parts of the bis (chloroformate).

This bis(chloroformate) was dissolved in 350 parts of acetone and added gradually to a solution of 49 parts of sodium azide in 250 parts of water. After stirring for 17 hours at room temperature the reaction was diluted with water and extracted two times with 350 parts of methylene chloride. The methylene chloride solution of the azidoformate was washed two times with water and dried over magnesium sulfate. Removal of the solvent gave a 95% yield of the desired product with the strong azide band at 2135 cm.$^{-1}$ in the infrared. Analysis for nitrogen showed it to contain 21.8% (theory 22.5%).

EXAMPLE 21

This example shows the preparation of bis(4-azidocarbonyloxybutyl) sebacate.

While cooling a mixture of 35 parts of bis 4-hydroxybutyl sebacate and 280 parts of methyl isobutyl ketone at 0° C., 30 parts of phosgene was added during 40 minutes. Stirring was continued for an additional five hours at 0° C. to 5° C. and then the mixture was allowed to warm up to room temperature while stirring overnight. The excess phosgene and hydrogen chloride were removed by rapid sparging with nitrogen. A solution of 16.2 parts of sodium azide in 75 parts of water was then added to this methyl isobutyl ketone solution of the bis(chloroformate). The reaction mixture was stirred and heated at 50° C. for four hours then was washed with 100 parts of water two times. After drying, the solvent was removed under vacuum at 50° C. The bis(4-azidocarbonyloxybutyl) sebacate so obtained had a strong azide band at 2135 cm.$^{-1}$ in the infrared. Analysis for nitrogen showed it to contain 16.5% (theory 17.4%).

EXAMPLE 22

This example demonstrates the preparation of the bis (azidoformate) of the di-n-butyl tartarate, i.e. tetramethylene-1, 4-bis(carbobutoxy)-2,3-bis(azidoformate).

While cooling a solution of 40 parts of phosgene and 260 parts of ether at 0° to 5° C., 26.2 parts of di-n-butyl tartarate was gradually added during 1.5 hours. The reaction mixture was stirred for an additional 5 hours at 5° C. after which the temperature was raised to reflux to remove the HCl and excess phosgene. This solution of the bis(chloroformate) was added to a slurry of 19.5 parts of sodium azide, 50 parts of water and 60 parts of acetone. The reaction mixture was rapidly stirred and refluxed for 5 hours and then was washed with water three times and dried over magnesium sulfate. On removal of the solvent under vacuum at room temperature, there was obtained 29 parts of the desired bis(azidoformate) having a strong azide band at 213 cm.$^{-1}$ in the infrared. A thermal decomposition of a portion of this product in diphenyl ether at 130° C. evolved 93% of the theoretical amount of nitrogen.

Any type of hydrocarbon polymer, including saturated, unsaturated, linear atactic, crystalline, or nonlinear amorphous polymers, as for example, polyethylene, polypropylene, polystyrene, styrene-butadiene rubber, butyl rubber, natural rubber, polybutadiene, polyisobutylene, ethylene-propylene copolymer, cis-1,4-polyisoprene, ethylene-propylene-dicyclopentadiene terpolymer, etc., and blends of these polymers with each other or nonhydrocarbon polymers can be cross-linked with any of the new azidoformates provided it has a boiling point of at least about 100° C. at a pressure of 70 mm. of mercury. In addition to the hydrocarbon polymers, a large number of nonhydrocarbon polymers can also be cross-linked with the new azidoformates. Typical of the nonhydrocarbon polymers that can be cross-linked in accordance with this invention are the cellulose esters such as cellulose acetate butyrate, the cellulose partial alkyl ethers such as hydroxyethyl and hydroxypropyl cellulose, chlorinated natural rubber, sulfochlorinated polyethylene, poly(vinyl acetate), poly(vinyl chloride, poly(vinylidene chloride), poly(ethyl acrylate), polyethylene oxide), poly[3,3-bis-(chloromethyl) oxetane], vinyl modified polydimethyl siloxane, polychloroprene, butadiene-acrylonitrile copolymer, etc., and blends of these polymers with each other or hydrocarbon polymers.

The cross-linking process can be carried out by heating the polymer plus the azidoformate compound above its decomposition temperature. This temperature varies over a wide range, but in general, will be in the range of from about 70° C. to about 350° C. Various amounts of cross-linking agent can be added, the optimum amount depending on the amount of cross-linking desired, the specific azidoformate compound employed, etc. For example, in some cases, such as in certain film applications, it may be desirable to merely add a sufficient amount of azidoformate compound to strengthen the polymer without materially affecting its solubility. In general, the amount added, based on the weight of the polymer, will be from about 0.01% to about 20%. In some cases, it may be desirable to add a small amount, i.e., from about 0.01% to about 1.0%, of sulfur, which seems to act as a co-agent for the azidoformates.

The cross-linking agent can be incorporated in the polymer in any desired fashion; for example, it can be uniformly blended by simply milling on a conventional rubber mill or dissolved in a solution containing the polymer. By either means, the azidoformate compound is distributed throughout the polymer and uniform cross-linking is effected when the blend is subjected to heat. Other means of mixing the cross-linking agent with the polymer will be apparent to those skilled in the art.

In addition to the cross-linking agent, other ingredients can also be incorporated. The additives commonly used in rubber vulcanizates can be used here also, as for example, extenders, fillers, pigments, plasticizers, stabilizers, etc. Exemplary of the fillers that can be added are calcium carbonate, iron oxide, carbon black, silica, calcium silicate (hydrated), alumina, etc. The presence of a filler, and in particular carbon black, is beneficial and, as in rubber compounding, gives optimum results. Obviously, there are many cases in which a filler is not required or desired, and excellent results are achieved when only the cross-linking agent is added.

The following examples are presented to illustrate the use of the new azidoformates for cross-linking polymers with parts and percentages being by weight unless otherwise specified. In some of the examples, the extent of cross-linking is determined by analysis for percent gain in insolubility in solvents in which the uncross-linked polymer was soluble and for the degree of swell therein, hereinafter termed "percent gel" and percent swell." Percent gel is indicative of the percentage of polymer that is cross-linked and percent swell is inversely proportional to the cross-link density. Percent gel and swell are determined as follows: A weighed sample of cross-linked polymer is soaked in a solvent, in which the uncross-linked polymer was soluble, at an elevated temperature for a specified length of time. The sample is then removed, blotted on filter paper so as to remove the solvent on the surface and weighed at once. The swollen sample is then dried to constant weight. The weights of initial and final sample are corrected for polymer and copolymer content based on knowledge of components. From these figures $$\frac{\text{Corrected dry weight}}{\text{Corrected initial weight}} \times 100 = \text{percent gel}$$

$$\frac{\text{Corrected swollen weight} - \text{corrected dry weight}}{\text{Corrected dry weight}} \times 100 \text{ percent swell}$$

The molecular weight of some of the polymers cross-linked in the examples can be indicated by their Reduced Specific Viscosity (RSV). By the term "Reduced Specific Viscosity" is meant the $\eta_{sp}/C$ determined on a 0.1% solution (0.1 g. of the polymer per 100 ml. of solution) of the polymer at elevated temperature.

EXAMPLES 23–31

Nine samples of elastomeric ethylene-propylene copolymers were cross-linked with different azidoformates as follows: In each example the copolymer and azidoformate were codissolved in carbon tetrachloride and then the solvent was allowed to evaporate overnight at room temperature. Each mixture was cured by heating in a closed iron mold for one hour at a temperature of 160° C. The resulting vulcanizates were odorless and had not discolored. The specific azidoformate used, the amount of each azidoformate used, the mole percent of propylene and RSV of the ethylene-propylene copolymer and the percent gel of the resulting vulcanizate, as determined in toluene at 80° C. are tabulated in Table I.

TABLE I

| Example | Mole percent propylene | RSV* | Azidoformate | Parts/100 parts of copolymer | Percent gel |
|---------|------------------------|------|--------------|------------------------------|-------------|
| 23 | 29 | 4.0 | Tetramethylene-bis(azidoformate) | 7 | 85 |
| 24 | 29 | 4.0 | 2,2'-oxydiethyl-bis(azidoformate) | 5 | 87 |
| 25 | 29 | 4.0 | 2,2'-ethylenedioxydiethyl-bis(azidoformate) | 5 | 81 |
| 26 | 31 | 1.9 | 2,2'-oxydipropyl-bis(azidoformate) | 5 | 83 |
| 27 | 31 | 1.9 | 2,2'-thiodiethyl-bis(azidoformate) | 6 | 76 |
| 28 | 31 | 1.9 | Pentamethylene-bis(azidoformate) | 10 | 88 |
| 29 | 31 | 1.9 | $\text{C(CH}_2\text{—O—CH}_2\overset{\overset{\text{CH}_3}{\vert}}{\text{C}}\text{H—O—}\overset{\overset{\text{O}}{\Vert}}{\text{C}}\text{N}_3)_4$ | 5 | 66 |
| 30 | 31 | 1.9 | 1,25-pentacosane-bis(azidoformate) | 10 | 86 |
| 31 | 31 | 1.9 | Bis(azidoformate) of poly(ethylene glycol) of mol. wt. 4,000 | 25 | 64 |

*As determined in decahydronaphthalene at a temperature of 135° C.

What I claim and desire to protect by Letters Patent is:
1. Azidoformates having the formula

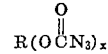

where $x$ is a whole number of 2 to 4 and R is selected from the group consisting of alkylene, oxydialkylene, thiodialkylene, sulfonyldialkylene, alkylene poly(oxyalkylene), alkylene bis(polyoxyalkylene), the radical

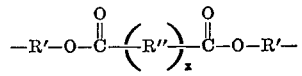

where $x$ is 0 or 1, R' is a bivalent or trivalent alkylene radical, and R" is a bivalent alkylene radical, alkylene bis(carboalkoxy), and carbyl tetrakis(alkyleneoxyalkylene), the azidoformate groups being attached to different carbon atoms in said R group, said alkylene radicals containing from 2 to 36 carbon atoms.

2. Alkylene-bis(azidoformate)s wherein the alkylene radical contains from 2 to 36 carbon atoms.

3. Oxydialkylene-bis(azidoformate)s wherein the alkylene radicals contain from 2 to 4 carbon atoms.

4. Alkylene-bis(oxyalkylene azidoformate)s wherein the alkylene radicals contain from 2 to 10 carbon atoms.

5. The bis(azidoformate) of poly(ethylene glycol).

6. The bis(azidoformate) of poly(propylene glycol).

7. Tetramethylene-bis(azidoformate).

8. 2,2'-oxydiethyl-bis(azidoformate).

9. 2,2'-thiodiethyl-bis(azidoformate).

10. The tetraazidoformate of pentaerythritol-propylene oxide adduct having the formula

11. Ethylene-bis(oxyethylene azidoformate).

References Cited
UNITED STATES PATENTS

| | | | |
|---|---|---|---|
| 3,211,752 | 10/1965 | Breslow | 260—349 |
| 3,324,148 | 6/1967 | Cotter | 260—349 |
| 3,360,513 | 12/1967 | Cotter | 260—349 X |
| 3,369,030 | 2/1968 | MacArthur | 260—349 |

JOHN M. FORD, Primary Examiner

U.S. Cl. X.R.

260—94.6, 3, 13

PO-1050
(5/69)

UNITED STATES PATENT OFFICE
CERTIFICATE OF CORRECTION

Patent No. 3,631,182     Dated December 28, 1971

Inventor(s) Breslow 22-26-33-53

It is certified that error appears in the above-identified patent and that said Letters Patent are hereby corrected as shown below:

Col. 1, line 54 of printed patent; page 2, line 27 of spec. -

$$R(OCN_3)_x \overset{O}{\underset{\|}{}} \quad \text{should be} \quad R(\overset{O}{\underset{\|}{O}}CN_3)_x$$

Col. 6, line 66 of printed patent; page 13, line 29 of spec. - add after 2180 cm.$^{-1}$

-- and the carbonyl peak at 1735 cm.$^{-1}$ --

Col. 10, line 51 of printed patent; page 21, line 14 of spec.

213 cm.$^{-1}$     should be     2135 cm.$^{-1}$

Signed and sealed this 6th day of June 1972.

(SEAL)
Attest:

EDWARD M. FLETCHER, JR.
Attesting Officer

ROBERT GOTTSCHALK
Commissioner of Patents